United States Patent [19]

Yates

[11] 3,981,823

[45] Sept. 21, 1976

[54] REGENERATION OF IRIDIUM-CONTAINING CATALYSTS

[75] Inventor: David J. C. Yates, Westfield, N.J.

[73] Assignee: Exxon Research and Engineering Company, Linden, N.J.

[22] Filed: Sept. 23, 1974

[21] Appl. No.: 508,104

Related U.S. Application Data

[63] Continuation-in-part of Ser. No. 343,304, March 21, 1973, abandoned, which is a continuation-in-part of Ser. No. 248,683, April 28, 1972, abandoned.

[52] U.S. Cl................................ 252/415; 208/140
[51] Int. Cl.$^2$.................... B01J 23/96; C10G 35/08
[58] Field of Search.................... 252/415; 208/140

[56] References Cited
UNITED STATES PATENTS

| | | | |
|---|---|---|---|
| 2,848,377 | 8/1958 | Webb................................ | 208/138 |
| 3,117,076 | 1/1964 | Brennan............................ | 208/140 |
| 3,850,747 | 11/1974 | Sinfelt et al..................... | 208/139 |

*Primary Examiner*—Winston A. Douglas
*Assistant Examiner*—P. E. Konopka
*Attorney, Agent, or Firm*—Jay Simon

[57] ABSTRACT

The instant invention relates to a process for activating iridium-containing catalysts, said catalysts being inactive because of the presence of the iridium as large crystallites of low activity, and which comprises the step of contacting said catalyst with a halogen-containing gas in the presence of from 0.01 to 10% by volume oxygen, at a temperature of at least 300°C. for a time sufficient to redisperse said large crystallites to crystallites having a substantially smaller particle size. Preferably, the catalyst is a reforming catalyst comprising iridium supported on alumina. In the most preferred embodiment of the instant invention an iridium: platinum on alumina catalyst, which has become deactivated by use in a reforming process wherein carbonaceous materials have deposited on the surface of the catalyst, is regenerated by (1) burning off said carbonaceous deposits by contacting said catalyst with oxygen at a temperature of at least 300°C. for a time sufficient to substantially remove said carbonaceous materials, (2) contacting said catalyst with hydrogen at a temperature and time sufficient to reduce said iridium and platinum substantially to metallic form, and (3) redispersing said metals by contacting said reduced catalyst with oxygen and a halogen-containing gas, e.g., chlorine, the oxygen being present in an amount of less than 10% oxygen by volume, at a temperature of at least 300°C.

16 Claims, 2 Drawing Figures

REGENERATION OF IRIDIUM-CONTAINING CATALYSTS

CROSS-REFERENCE TO RELATED APPLICATIONS

This application is a continuation-in-part of Ser. No. 343,304 filed Mar. 21, 1973, now abandoned which in turn is a continuation-in-part of Ser. No. 248,683, filed Apr. 28, 1972, now abandoned.

BACKGROUND OF THE INVENTION

1. Field of the Invention

The instant invention relates to a process for activating iridium-containing catalysts, said catalysts being inactive because of the presence of the iridium as large crystallites of low activity, and which comprises the step of contacting said catalyst with a halogen-containing gas and oxygen, the oxygen being present in an amount of less than 10% by volume oxygen, at an elevated temperature for a time sufficient to redisperse said large crystallites to crystallites having a substantially smaller particle size. Preferably, the catalyst is a reforming catalyst comprising iridium supported on alumina. In the most preferred embodiment of the instant invention an iridium or iridium:platinum on alumina catalyst, which has become deactivated by use in a reforming process wherein carbonaceous materials have deposited on the surface of the catalyst, is regenerated by (1) burning off at least a portion of said carbonaceous deposits by contacting said catalyst with oxygen at a temperature of at least 300°C., (2) contacting said catalyst with hydrogen at a temperature and time sufficient to reduce at least a portion of the iridium to its metallic form, and (3) redispersing the iridium by contacting said reduced catalyst with a halogen-containing gas, e.g., chlorine and oxygen, the oxygen being present in an amount less than 10% oxygen by volume, but sufficient to enhance the redispersion of the iridium on the catalyst and at a temperature of at least 300°C.

2. Description of the Prior Art

U.S. Pat. No. 3,134,732 teaches that noble metal hydrocarbon conversion catalysts may be reactivated, after burning off carbonaceous deposits, by contacting said catalysts with chlorine gas at a temperature of from 60°F. (~15°C) to 1250°F. (~677°C) for a time sufficient to restore said catalyst to initial activity. Mixtures of chlorine gases with inert gases or oxygen are taught to be equivalent to 100% chlorine so long as an amount of chlorine equal to from 0.1 to 10% by weight catalyst is contacted with said catalyst. Further inventions in this area include U.S. Pat. No. 3,020,240 which teaches the use of chlorine and an optimum of 20 mole % of oxygen in a process for reactivating catalysts, and U.S. Pat. No. 3,243,384 which teaches the use of steam, air and chlorine mixtures in regenerating or activating a platinum on alumina catalyst. All of the above patents are mainly interested in platinum as the catalyst metal and mention of other catalyst metals is merely incidental.

U.S. Pat. No. 3,147,229 discloses the importance of maintaining high metal surface areas in platinum, palladium or rhodium on alumina catalysts for hydrocarbon conversions. The high metal areas are achieved by regenerating the catalyst in the presence of a chlorine in air mixture to restore metal surface area (redispersion of the metal).

SUMMARY OF THE INVENTION

According to the present invention, it has unexpectedly discovered that iridium-containing catalysts, said iridium being present in said catalyst in the form of large crystallites of low catalytic activity which result via various mechanisms during the burning operation employed to remove carbonaceous deposits, may be activated by contacting said catalyst with a gaseous mixture of critical composition comprising a halogen-containing compound and oxygen, at conditions whereby the metal is redispersed such that the surface area of the iridium metal present on the catalyst is at least 200 square meters per gram of iridium as determined by the carbon monoxide chemisorption method described by Yates and Sinfelt, J. Catalysis, 8, 348 (1967). In particular, it is critical that no more than 10% by volume of oxygen be present during said redispersion. On the lower end it is sufficient to have enough oxygen to enhance the redispersion of the iridium. Preferably the gaseous mixture will comprise less than 5% by volume of oxygen, more preferably less than 3%, in operations conducted at pressures ranging from 0.1 to 5 atmospheres. In an operation conducted at elevated pressure, e.g., 5 to 30 atmospheres, the $O_2$ concentration of the treating gas mixture should be maintained below about 0.5% by volume, most preferably between 0.1 and 0.3% by volume. It should be recognized that the partial pressure of oxygen in the gaseous mixture should not exceed about 0.1 atmosphere, notwithstanding the total pressure employed in the treatment operation. Hence, as the treatment pressure is increased, the volume % oxygen present in gaseous mixtures decreases. The gaseous mixture may further comprise inert gases such as $N_2$, $H_e$, Ar, $H_2O$, $CO_2$, etc. Preferably, the gaseous mixture is substantially sulfur-free.

The halogen-containing compound may be $F_2$, $Cl_2$, $Br_2$ or $I_2$, or a compound which is thermally or oxidatively degraded or converted to yield these halogens at redispersing conditions, e.g. carbon tetrachloride. Preferably, the halogen will be $F_2$ or $Cl_2$ and will vary from 0.01 to 100% by volume of the gaseous mixture. Most preferably, the halogen is chlorine and comprises from 0.05 to 5% by volume of the gaseous mixture with about 0.08 to 1% the most preferred concentration. Preferably the moles of $O_2$ present in the gaseous mixture should not exceed the moles of $Cl_2$ present therein.

The catalyst metal is preferably redispersed by flowing the above-defined gaseous mixture over the catalyst, the process taking place at a temperature of at least 300°C. More preferably, the catalyst metal is redispersed by contacting with said gaseous mixture at a temperature of from 300° to 650°C. It is also possible to redisperse the metal in the catalyst by static contact with the gaseous mixture.

The catalyst metal may be redispersed at any pressure at which a significant amount of halogen or halogen-containing compounds can be contacted with said catalyst. Preferably, the redispersion takes place at a total pressure of from 0.1 to 30 atmospheres, more preferably at from 5 to 20 atmospheres.

Figure 1:
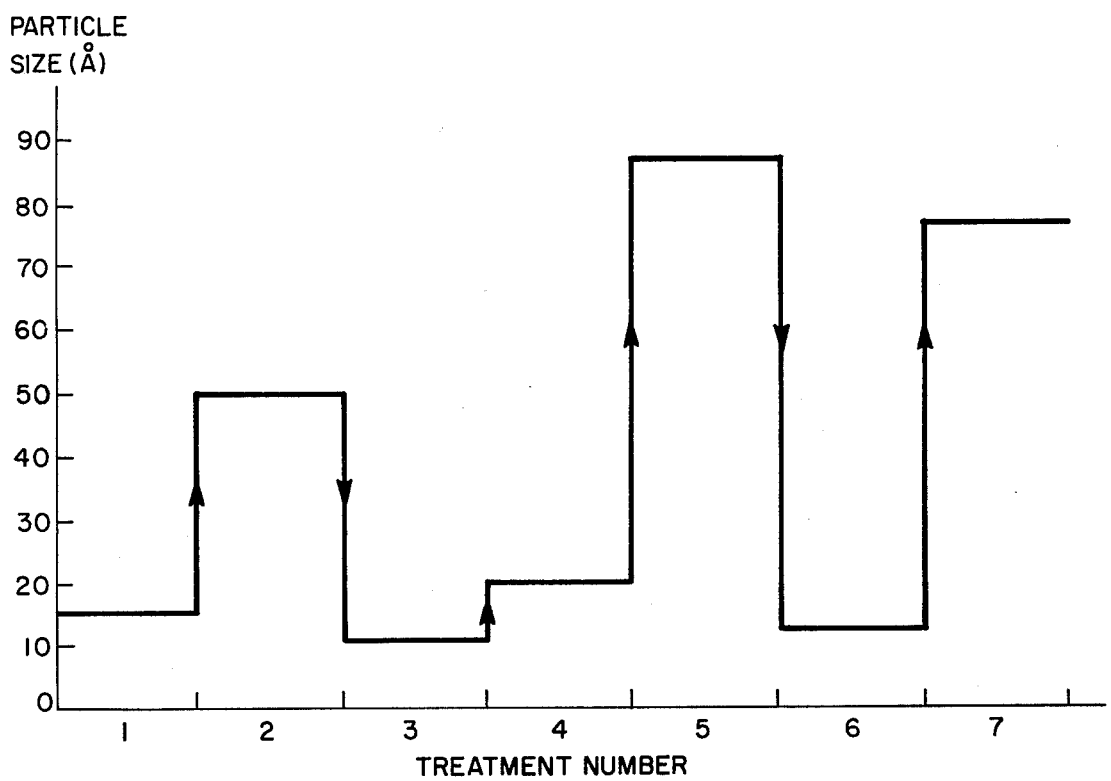
FIGS. 1 and 2 illustrate the effect of various treatment operations described in Example 1 on iridium particle size.

The catalyst which is treated by the process of the instant invention comprises iridium. Preferably the iridium is present on a support material. Although iridium catalysts have use in many areas, including fuel cells, the process of the instant invention is especially suitable for treating supported iridium containing hydrocarbon conversion catalysts. The instant process may be used for the initial preparation of said hydrocarbon conversion catalysts, but is especially suitable for the regeneration of supported iridium hydrocarbon conversion catalysts which have become deactivated by the deposition of carbonaceous deposits during use in hydrocarbon conversion processes.

The support, or carrier component, of the catalysts useful in hydrocarbon conversion processes is preferably a porous, adsorptive material having a surface area, as determined by the Brunauer-Emmett-Teller (BET) method, of from about 20 to 800, preferably 100 to 300, square meters/gram. The support material should be substantially refractory at the temperature and pressure conditions utilized in any given hydrocarbon conversion process. Useful support materials include: (a) silicon-based materials such as silica or silica gel, silicon carbide, clays, natural or synthetic silicates such as kieselguhr, kaolin, china clay, Attapulgus clay, etc.; (b) ceramic compositions such as crushed porcelain or fire brick; (c) alumino-silicate zeolite materials such as naturally occurring or synthetic erionite, mordenite, faujasite, etc. that may or may not be previously converted to a hydrogen or ammonia form and reduced in soda content by virtue of an exchange with various metal ions, including rare earth metal cations; (d) refractory inorganic oxides, including alumina, titanium dioxide, zinc oxide, magnesia, thoria, chromia, silica-alumina, alumina-titania, silica-zirconia, alumina-chromia, etc.; and (e) mixtures of one or more of the materials referred to above.

Refractory inorganic oxide materials are the preferred catalyst support materials. In general, superior results are obtained with alumina-containing compositions. Alumina is the preferred support for use in reforming catalysts. The support materials described above are known articles of commerce and can be prepared for use as catalyst constituents by many varied techniques. Typically, the support materials are used in the form of spheres, granules, powders, extrudates or pellets, etc. The precise size or shape of the support material used is dependent upon many engineering factors not within the purview of the instant invention.

The catalysts which are treated by the process of the instant invention may be multimetallic. One metal, of course, will be iridium. The remaining metals may be selected from the group consisting of metals of Group IB, VIB, VIIB or VIII of the periodic Table of the Elements. Preferably, the metals are selected from the group consisting of platinum, palladium, rhenium, osmium, ruthenium, rhodium, copper and gold, most preferably, the catalyst is bimetallic and the other metal is platinum.

The catalysts which may be treated by the process of the instant invention are preferably reforming catalysts. Iridium-containing reforming catalysts are preferably supported on alumina. The catalyst may further contain added halogen which may in incorporated during the preparation of the cayalyst, e.g. from the anion of the salt used to impregnate the alumina, or added later. The process of the instant invention will restore halogen lost during use in the reforming process, as well as redisperse the metal in the catalyst by converting the large metal crystallites to smaller crystallites.

Iridium reforming catalysts are prepared by impregnating an iridium salt such as chloroiridic acid on a predominantly alumina support having a surface area of from 20 to 800 m$^2$/gm. This impregnation may be done by standard techniques known in the art. For example, a solution of the iridium-containing salt is dissolved in water and mixed with the support. The excess water is then removed and the composite is dried in air or other gases at about 110°C. for several hours. A secondary drying step at a temperature of about 250° to 370°C. has been found to be beneficial. Care must be taken to avoid contacting any iridium-containing catalyst, during preparation, with gases containing oxygen, even at concentrations as low as 1% oxygen if the temperature is in excess of about 370° to 450°C., otherwise the iridium will become oxidized, and form large crystallites of iridium oxide. Upon subsequent reduction, large particles of iridium metal will be obtained, resulting in a catalyst of low activity. The iridium metal catalyst, when prepared according to the above procedure, will have a metal surface area of from 200 to 238 m$^2$/gm, which corresponds to iridium particle sizes (length of a side of an assumed cubic crystallite) of greater than about 11 Angstroms (A). In preparing the preferred platinum-iridium reforming catalyst, a platinum salt will also be impregnated simultaneously with the iridium. The treatment of such multimetallic catalysts after impregnation is usually similar to that described for the above iridium-containing catalyst. The catalyst useful in reforming reactions will thus preferably comprise iridium and platinum on an alumina support containing from 0.1 to 3.0% halogen, preferably chlorine, the metal surface area of such catalysts being greater than about 200 m$^2$/gm., as determined by the aforesaid CO chemisorption method.

As previously stated, all iridium-containing catalysts may be beneficially treated by the process of the instant invention, but preferably the subject catalyst is an iridium:platinum on alumina reforming catalyst. The mole ratio of iridium and platinum may vary from 1:10 to 10:1. Preferably, the mole ratio will be 1:1. The total metal content of the catalyst may vary from 0.01% to 10%. Preferably, the total metal will equal 0.1 to 1.0% of the total catalyst weight, on a dry basis. For reforming reactions it is preferred to have at least about 0.1 wt. % iridium on the total catalyst.

The iridium, preferably iridium:platinum on alumina catalyst, will be utilized in the reforming process wherein petroleum fractions such as naphtha are converted into high octane products. Preferably, the naphtha is substantially sulfur-free and typically contains from 15 to 80 volume % paraffins, 15 to 80 volume % naphthenes and about 2 to 20 volume % aromatics. Naphtha boils at about 25°C. to about 230°C and preferably at about 60° to 190°C. at atmospheric pressure. In the reforming process, naphtha is contacted with a catalyst in the presence of hydrogen in the vapor phase at a temperature varying from about 350° to 550°C., preferably about 400° to 530°C. The pressure in the reaction zone may vary from 1 to 50 atmospheres, preferably from about 5 to 25 atmospheres. After long periods of use, the catalyst will become less active, that is, optimum conversion to high octane products will no longer be achieved. This loss in activity is primarily due to the slow buildup of carbonaceous deposits on the catalyst surface.

In the prior art, reforming catalysts are regenerated by treatment with controlled amounts of oxygen to burn off carbon from the surface of the catalyst. This burn-off step is notoriously difficult to control, and temperature runaways, wherein temperatures as high as 700°C. are reached, are not uncommon. When this occurs, the carbon is, of course, substantially removed, but the particle size of the catalyst metals are undesirably increased to a very large degree.

It is known in the prior art to treat deactivated platinum reforming catalysts with a halogen, especially chlorine, in an oxidizing atmosphere to restore activity. This procedure effectively adds halogen to the catalyst and, in addition, reduces the particle size of the platinum, or in other words, redisperses the platinum.

It has been unexpectedly discovered, however, that although platinum may be effectively redispersed to a highly active state by treatment with halogen in an oxidizing atmosphere, wherein the oxygen concentration is not at all critical, unless the oxygen concentration is very carefully controlled, the iridium will not be redispersed (metal surface area increased) to give a highly active catalyst. For example, when an iridium on alumina catlyst of large iridium particle size (greater than 100A) is treated with a mixture of 1% chlorine in air at atmospheric pressure under either static or dynamic conditions, very little redispersion of the iridium takes place. Such large metal particle sizes give catalysts with very low activity. However, treatment of the same catalyst at atmospheric pressure with a gaseous mixture containing 1% chlorine, less than 10 volume % oxygen, and the remainder an inert gas will give an active catalyst. Preferably, the volume % oxygen will be about 0.01 to 10 volume %, more preferably 0.1 to 10 volume %, still more preferably 0.1 to 5 volume %, and yet more preferably 0.1 to 1.0 volume %.

When an iridium:platinum reforming catalyst which has been inactivated by use in the reforming process is treated by the prior art method of chlorine and air immediately after an oxidizing treatment, at dynamic or static conditions, some decrease in overall particle size is obtained. However, the particle size of the metals is not reduced to the particle size level or metal surface area existing in the initial catalyst prior to use, unless the amount of oxygen present with the halogen is held less than 10% at atmospheric pressure, and also unless the catalyst is reduced prior to the halogen treatment.

It has been observed with deactivated iridium: platinum catalysts (using differential X-ray diffraction techniques) that while the platinum when treated with chlorine and air is substantially converted to its original particle size, the iridium persists as large crystallites separate from the platinum, even if the catalyst be reduced prior to admitting halogen. When the oxygen concentration ranges from 0.01 to 10 volume % preferably 0.1 to 10 volume %, more preferably 0.1 to 5 volume %, still more preferably 0.1 to 1.0 volume %, and most preferably about 0.1 to 0.3 volume %, both the iridium and the platinum are reduced to approximately the original particle size of the fresh catalyst and a metals surface area of greater than about 200 m$^2$/gm.

in the case of osmium, iridium or platinum and greater than about 400 m$^2$/gm. in the case of ruthenium, rhodium or palladium are secured. Particle size reduction (redispersion) can be obtained when the treating gas mixture is substantially oxygen-free; however, the presence of small amounts of oxygen further enhances the redispersion of the iridium. This result has been obtained by both measurement of overall metal particle size with the previously described carbon monoxide chemisorption techniques and by determining the X-ray diffraction pattern of the metals.

Thus, in the preferred process for regenerating iridium-containing reforming catalysts, especially iridium:-platinum on alumina reforming catalysts, the catalyst is first treated with oxygen in controlled amounts to burn off at least a portion of the carbonaceous deposits which accumulate during such service. This burn off is carried out at a temperature of at least 300°C., preferably from 300° to 600°C. under either static or dynamic conditions. The oxygen concentration is controlled during this procedure so that high temperatures caused by uncontrolled carbon:oxygen reactions are not obtained. However, because the process of the instant invention gives advantages over the process of the prior art, the need for extreme care in this area is not at all as critical as formerly, since catalysts which become very badly damaged during uncontrolled burn off may now be restored to substantially initial activity. Such redispersion in situ saves the high cost of discharging the catalyst from the reactor, reclaiming the noble metal and recharging the reactor with the new catalyst. Following the burn-off step, the catalyst is reduced by contacting with a reducing gas, H$_2$, CO, NO, etc., preferably H$_2$, at temperatures between 100° and 650°C. or higher, preferably at temperatures between about 200° – 550°C. Preferably the reducing gas is substantially sulfur-free. After contact with the reducing gas the system is purged, either by evacuation or sweeping (flowing) a quantity or purge gas through the chambers. Sweeping of the system can be effected with an inert gas, such as steam, nitrogen, carbon dioxide, etc. Removal of the reducing gas, particularly hydrogen, eliminates any possibility of the presence of a dangerous gas mixture in the system when the halogen and oxygen are introduced into the system.

The metal in the iridium-containing reforming catalyst is then redispersed by contacting it, either dynamically or statically, with the previously described oxygen and halogen-containing gaseous mixture. Preferably, the halogen is chlorine gas. The oxygen concentration is held below 10% by volume of the total gaseous mixture, while the remainder of the mixture is made up of inert gases, i.e., CO$_2$, steam, nitrogen, argon and helium, carbon monoxide, etc. Preferably, nitrogen, argon or helium is used as the inert. Preferably, at atmospheric pressure, the oxygen concentration is held below 5% by volume e.g., 0.1 –5.0%, while a concentration of about 1% is most preferred. The oxygen concentration of the gas mixture will, as explained earlier, decrease when the treating operation is conducted at elevated pressures. The temperature at which the redispersion step is carried out varies from 300° to 650°C., preferably 400° to 600°C., most preferably the temperature ranges from 450° to 550°C.

Further parameters which are to be considered during the redispersion step include pressures which are preferably from 0.1 to 30 atmospheres and more preferably from 5 to 20 atmospheres. As stated previously, the redispersion may be done under static conditions. However, it is preferred to flow the halogen-containing gaseous mixture across the catalyst at a rate of from 0.01 to 500 ml/sec/gm, more preferably from 1 to 20 ml/sec/gm.

The iridium-containing catalyst, which is the subject of the process of the instant invention, may be redispersed either in situ or may be removed from the reactor, and then redispersed, if such a procedure offers an advantage.

The process of the instant invention is also useful for treating ruthenium, rhodium and osmium-containing catalysts which, like iridium-containing catalysts, may be more efficiently regenerated by contacting with a halogen-containing gas in the presence of less than 10% by volume oxygen.

The following are the most preferred embodiments of the instant invention.

EXAMPLE 1

Regeneration of Iridium On Alumina Catalysts

A 1% by weight iridium on alumina catalyst was prepared by taking 99 gms of eta alumina and mixing it with 10 milliliters of an aqueous solution of chloroiridic acid, the latter containing 0.1 gm of iridium per ml of solution. The catalyst was then dried in air at 110°C. for 16 hours. About 5 gms of the dried catalyst were then charged to a Pyrex glass flow cell, the air removed from the cell, and pure hydrogen passed through it at 500 ml/minute. The sample was then heated from room temperature to 500°C. in the flowing hydrogen, and held to 500°C. for 1.25 hours. Full details of the apparatus and procedures used can be found in the published literature (D. J. C. Yates, W. F. Taylor and J. H. Sinfelt, J. Am. Chem. Soc., 86, 2996, 1964 and D. J. C. Yates and J. H. Sinfelt, *J. Catalysis*, 8, 348, 1967).

After the reduction described above, the hydrogen was removed from the catalyst by evacuation with high vacuum at 500°C. The sample was then cooled to room temperature under vacuum, and two carbon monoxide isotherms measured at 20°C., using the procedures given in the 1967 article mentioned above. The particle size of the iridium, calculated from the amount of CO chemisorbed, was found to be 15A or 180 square meters per gram of iridium ($M^2$/gm. Ir). This indicates that the iridium was not fully dispersed, as the equivalent particle size for atomically dispersed iridium is 11.2A (238 $m^2$/gm. Ir).

The catalyst was then oxidized in situ in its Pyrex cell by adding pure oxygen at a pressure of 5 cm Hg, heating from room temperature to 500°C., then held at 500°C. for 2 hours. The same was then cooled to room temperature, reduced at 500°C. and carbon monoxide isotherms run in a fashion identical with that used in the first treatment. The particle size of the iridium was now found to be 50A (53 $m^2$/gm. Ir.); this is a large decrease in dispersion levels, and indicates the sensitivity of this catalyst to oxygen at elevated temperatures (Treatment 2, FIG. 1). The third treatment of this catalyst, also in situ in the Pyrex cell, consisted of heating the catalyst from room temperature 500°C. in a flowing gas containing 1% $Cl_2$, 1% $O_2$, 98% He and holding at 500°C. in the presence of the gas mixture for 3 hours. After reduction and CO isotherms as in the first treatment, the iridium had a particle size of 11A, equivalent to atomically dispersed metal (i.e., every metal atom is on the surface of the support and accessible for catalytic reactions). It is interesting that in addition to undoing the damage done by oxygen in treatment 2, this chlorine treatment gave a better dispersion of the iridium than was present in the fresh catalyst (Treatment 3, FIG. 1).

The fourth and fifth treatments consisted of two oxidations at 500°C., the first with 1% $O_2$ in He treatment 4), followed by oxidation in air at 500°C. (Treatment 5). The iridium after this treatment was now at a very low level of dispersion, the particle size being 87A (31 $m^2$/gm. Ir.), an undesirable state of affairs. A second chlorine treatment under identical conditions to those used the first time now redispersed the iridium to 13A (198 $m^2$/gm. Ir.) (Treatment 6, FIG. 1).

The well dispersed catalyst was then passivated and discharged from the vacuum cell. Two grams were then charged into a metal high pressure reactor for heptane reforming studies. The catalyst then behaved in a manner typical of that which is well known to be characteristic of a highly dispersed iridium on alumina catalyst, i.e., there was a high overall conversion and a high initial methane make (see Table I for details). After discharge from the reactor, considerable carbon was seen on the exterior of the catalyst.

The sample was then re-charged to the Pyrex glass cell, and the carbon burned off the catalyst in a two-step treatment. The first involved slowly heating the catalyst to 500°C. in a flow of nitrogen containing 1% oxygen. After reaching 500°C., the oxygen concentration was increased to 20% by the use of dry air, and the sample held under these conditions for one hour. All visible carbon was removed by this treatment. After reduction, CO isotherms showed an iridium particle size of 77A (35 $m^2$/gm. Ir.) (Treatment 7, FIG. 1).

The catalyst was taken out of the vacuum cell again, and put in the high pressure metal reactor for a second time. The sample then showed (see Table I) low conversion of heptane and a low methane make—both being characteristics of an inactive catalyst having poorly dispersed metal. Little carbon was seen on discharging the catalyst, consistent with its low activity.

To demonstrate the ability of the redispersion technique of this instant invention to achieve multiple regenerations, the sample was again charged to the vacuum system and the whole cycle repeated. That is, the carbon was burned off, sample reduced, then chlorine treated in the identical fashion to that used before. On placing the catalyst in the reactor for the third time, it was again found to be catalytically identical to a fresh iridium catalyst containing very well dispersed iridium (see Table I).

TABLE I

Correlation Between Iridium Dispersion and Catalytic Activity for Heptane Conversion

| Treatment No. (See FIG. 1) | Particle Size of Ir (A) | Catalytic Activity | | |
|---|---|---|---|---|
| | | Conversion % | $C_1$ and $C_2$ Yield % | Total Aromatic % |
| 6 | 13 | 66 | 63 | 8.6 |
| 7 | 77 | 25 | 4 | 5.6 |
| 8 | Not measured | 83 | 52 | 8.9 |

The catalytic data above were obtained 165 minutes after the feed was brought in contact with the catalyst. All values are given in mole % of feed. The reaction conditions were 454°C.; hydrogen:hydrocarbon ratio 5:1; liquid hourly space rate 20 w/hr/w; and 200 psig. total pressure.

Example 2

Figure 2:
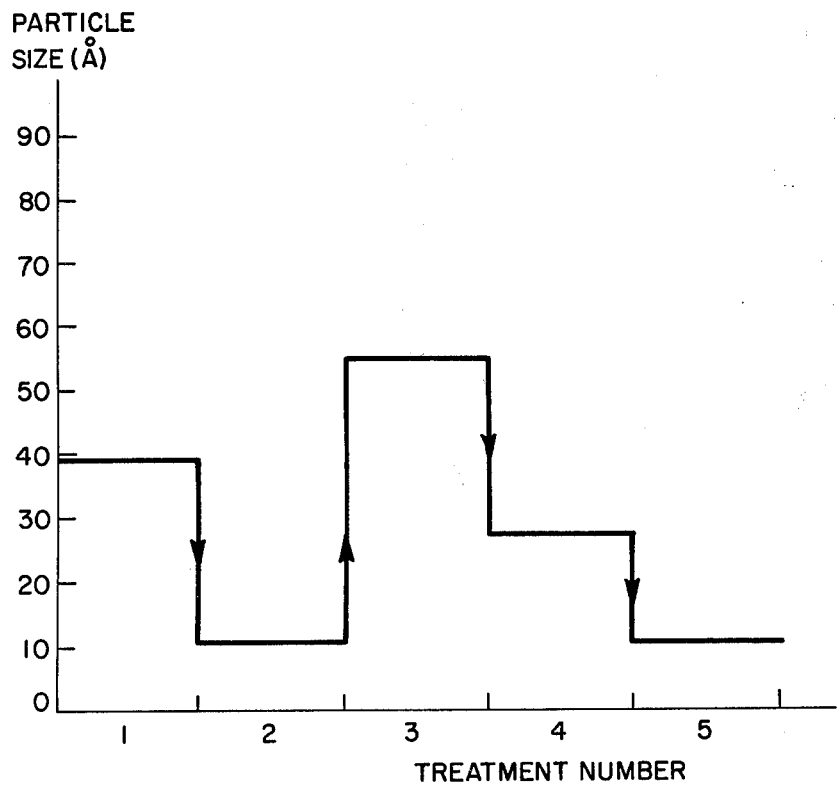

Regeneration of Iridium on Alumina with Chlorine in Air vs. Chlorine and low Amounts of Oxygen Another sample was taken of the catalyst used in Example 1, and reduced as in that example. The catalyst was then oxidized in situ in its glass adsorption cell with flowing air at 500°C. for 2 hours. After rereduction, and running the carbon monoxide isotherms, it was found that the iridium had grown to 39A (69 m²/gm. Ir.) (Treatment 1, FIG. 2).

After a chlorine treatment consisting of heating the catalyst from room temperature to 500°C. in the presence of a gas mixture composed of 1% $Cl_2$, 1% $O_2$, 98% He and then contacting the catalyst with the gas mixture at 500°C. for 2 hours, it was found that the iridium had been completely redispersed (Treatment 2).

The catalyst was again oxidized as in Treatment 1, and it was found that the iridium particles had grown to 55A (49 m²/gm. Ir.). The sample was then chlorine treated as in Treatment 2 except that the gas mixture was 1% chlorine in air, and the time of treatment at 500°C. (holding period) was for 3 hours (Treatment 4). Some redispersion of the iridium was achieved, as the particle size was reduced from 55A to 28A (96 m²/gm. Ir.), but this is substantially less than the atomic dispersion level which is necessary for maximum catalytic activity.

Finally, the sample was again treated with chlorine as in Treatment 2 above, the original mixture now being used (1% $Cl_2$, 1% $O_2$, 98% He), at 500°C. for 3 hours. Again, atomic dispersion was readily achieved with the use of low oxygen concentrations, as taught by this instant invention (Treatment 5).

Example 3

Regeneration of Iridium:Platinum on Alumina Catalysts

In this and the following experiments, a 0.3% iridium, 0.3% platinum, by weight, on alumina catalyst was utilized. A typical preparative procedure includes contacting 100 gms. of gamma alumina (in the form of 1/16 inch extrudates) with a solution containing both iridium and platinum salts. The latter is prepared by taking 150 ml. of distilled water and adding to it 3 ml. of a chloroiridic acid solution containing 0.1 gm. of iridium per ml. of solution and 3 ml. of a chloroplatinic acid solution containing 0.1 gm. of platinum per ml. of solution. The alumina is added to the above solution and left for several hours at room temperature. After removing the excess water, the catalyst is dried in air at 110°C. for 16 hours, then at 250°C. for 3 hours. This is catalyst 3(A).

Five grams of this catalyst were charged to the apparatus as used in Example 1, reduced in hydrogen for 1 hour at 500°C. After CO chemisorption isotherms has been run, it was found that both metals were fully dispersed, as every metal atom was in the surface (equivalent particle size is 11.6A, for a 50%, 50% mixture of Ir + Pt).

A second catalyst 3(b) was prepared as follows. Fifty grams of catalyst 3(a) were changed to a furnace and heated in air at 760°C. for 48 hours. This experiment simulates temperatures which might be obtained if the temperature became out of control during the process of removing the carbon from catalysts deactivated by use under reforming conditions.

Five grams of 3(B) were then charged to the adsorption apparatus, and reduced as detailed above for catalyst 3(a). Very much less carbon monoxide was found to be adsorbed, and the average metal particle size was found to be 300A (9m²/gm. Ir.).

In the case of bi- or multi-metallic catalysts of this type, chemisorption measurements using gases which are adsorbed on all the metals used, can only give an average metal particle size. To obtain information about the particle size of individual metals, the only method available is to use X-ray diffraction techniques (see Yates et al, supra).

When catalysts containing very small amounts of metal are used, for example, catalysts 3(A) and 3(B), different techniques than normal have to be employed, especially if the support material has an X-ray spectrum. This is the case with the alumina used here. The X-ray technique developed for this work is to first run the spectrum of the catalyst, for example, catalyst 3(B), after reduction with hydrogen. Then a portion of the same alumina used to prepare catalyst 3(A) was taken, and heated in air for 48 hours at 760°C., in a fashion identical to that used in preparing sample 3(B). The X-ray spectra of this calcined alumina was then run, using identical scanning procedures as those used with the reduced catalyst 3(B). These comprised recording in steps of 0.05° in $2\theta$ over the values of 51 to 12° of $2\theta$, counting at 80 sec. at each position to ensure good signal to noise ratios. The data were collected in digital form, and the two sepctra were subtracted using a computer. Scaling was carried out, if needed, in regions of the spectra remote from the metal peaks. This final subtraction gives the spectra of the metals alone, the peaks due to the alumina having been cancelled out by this procedure.

Data obtained in this way with copper K radiation on a reduced sample of catalyst 3(B) show separate, discrete peaks for platinum at 39.8 $2\theta$, and for iridium at 40.6 $2\theta$, corresponding to the 111 planes. The particle size of the Pt was 620A and of the Ir 340A. The agreement with the chemisorption value (average 300A) is reasonable considering the errors in both methods with these very large particles. The errors in chemisorption methods are least when the metal is fully dispersed, and become higher as the particle size increases. With X-rays, particles of less than 50A give peaks too broad to be measurable and as soon as the peaks are measurable, the optimum accuracy is obtained. Above about 300A, the peaks gradually become so narrow as to be indistinguishable from lines of the bulk metals, and this again decreases the accuracy.

The process of redispersion, when part of the metal is in the atomic state, and some, say, in the 300A state can thus only be followed with X1ray techniques by measuring the amount of large particle size material remaining, as the metal with particle size below about 50A cannot be detected in the X-ray spectrum.

EXAMPLE 4 REGENERATION OF IRIDIDIUM:PLATINUM CATALYST a 5 gm. aliquot of catalyst 3(B) was charged to the Pyrex cell, and reduced in hydrogen at 500°C. It was then treated by heating from room temperature to 500°C. in the presence of a flowing gas of composition 1% $Cl_2$, 1% $O_2$, , 98% $N_2$ and held at 500°C. in the presence of the flowing gas for 6 hours. Examination by differential X-ray spectroscopy, by the method given in Example 3, showed 5% of the platinum in crystals larger than 50A, and 45% of the iridium in large crystals. The data from chemisorption can be put into a form to give the percentage of large iridium by assuming that all of the platinum is well dispersed. This is a good assumption here. The chemisorption data then show 27% of the iridium to be in the form of large crystals.

EXAMPLE 5

Regeneration of an Iridium: Platinum Catalyst

A 5 gm. aliquot of catalyst 3(B) was charged to the Pyrex cell, and reduced at 500°C. It was then treated by heating from room temperature to 500°C in the presence of a flowing gas of composition 1% $Cl_2$, 3% $O_2$, 96% $N_2$ and held at 500°C. in the presence of the flowing gas for 6 hours. X-ray data (as in Example 3) showed 6% large platinum crystals and 45% large iridium crystals. Chemisorption data, treated as in Example 4, indicated 33% of the iridium present as large crystals.

EXAMPLE 6

Regeneration of an Iridium: Platinum Catalyst

A 5 gm. aliquot of catalyst 3(B) was charged to the Pyrex cell, and reduced at 500°C. It was then treated by heating from room temperature to 500°C. in the presence of a flowing gas of composition 1% $Cl_2$, 5% $O_2$, 94% $N_2$ and held at 500°C. in the presence of the flowing gas for 6 hours. X-ray (as in Example 3), showed 0% large platinum crystals and 51% large iridium crystals. Chemisorption data, treated as in Example 4, indicated 43% of the iridium to be in the form of large crystals.

EXAMPLE 7

Regeneration of an Iridium: Platinum catalyst

A 5 gm. aliquot of catalyst 3(B) was charged to the Pyrex cell and reduced at 500°C. It was then treated by heating from room temperature to 500°C. in the presence of gas mixture comprising 1% $Cl_2$, 20% $O_2$, 79% $N_2$ and held at 500°C. in the presence of the gas mixture for 6 hours. X-ray data, as in Example 3, showed 14% large platinum crystals and 64% large iridium crystals. Chemisorption data, assuming all the platinum was well dispersed, indicated 100% large iridium crystals. As, in fact, the X-ray data showed that some 14% of the platinum was in the form of large crystals, the chemisorption data corrected for this show that some 86% of the iridium was in the form of large crystals.

Although there is necessarily some variance in the values obtained, it will be seen that, as the oxygen content of the treating gas increases from 1% in Example 4 to 20% in this example, we go from a condition where, on the average, only 36% of the iridium is in large particles to a state, where, on the average, 76% of the iridium has not been redispersed. Furthermore, minor modifications of the procedure using 1% oxygen can be made to yield virtually 100% redispersion of the iridium (see Example 11). Such modifications are expected to have little effect on the precedure using 20% oxygen.

Furthermore, it should be noted that in all Examples 4 to 7 inclusive, the platinum in the catalyst was essentially all redispersed to a very small particle size. This confirms the unexpected nature of the instant invention, where, with iridium-containing catalysts, the oxygen content of the treating gas is an extremely critical factor in redispersion of the iridium to the extremely small particle size needed for efficient commercial operation.

EXAMPLE 8

Regeneration of an Iridium: Platinum Catalyst

To show that it is helpful, in most cases, to have some small amount of oxygen present, the experiment of Example 4 was repeated, except that the treatment with 1% $Cl_1$, 99% $N_2$, at 500°C. and the holding period was 6hours. X-ray data (obtained as in Example 3) showed 0% large platinum crystals and 48% large iridium crystals. Chemisorption data, treated as in Example 4, indicated 43% of the iridium present as large crystals.

EXAMPLE 9

Regeneration of Iridium: Platinum Catalysts with Varying Chlorine Concentration

In contrast with the finding in this instant invention that the concentration (or ratio to chlorine) of oxygen is a critical factor in the regeneration and redispersion of iridium-containing catalysts, it has been determined that the chlorine concentration can be varied over a very wide range without materially affecting the process.

As an instance, the experiment of Example 8 was repeated, except that the treatment of the sample of catalyst 3(B) was with pure, elemental gaseous chlorine at 500°C. and the holding period was 6 hours. X-ray data obtained after this showed that none of the platinum was present as large crystals and only 14% of the iridium was present as large crystals. Chemisorption data, treated as in Example 4, indicated 17% of the iridium as present in large crystallites.

This result shows that the process taught by the instant invention can be operated at any desired chlorine concentration, and that the presence of the diluting gas (e.G., $N_2$, Ar, He, Ne, etc. plays little, if any, part in the process. It will, of course, be realized by those familiar with the corrosion problems engendered by the usage of chlorine in any form of metallic vessel that it is of extreme importance to minimize such corrosion if the process of the instant invention is to fluid ready usage. Other factors being equal, such minimizing of corrosion can best be achieved by keeping the concentration of the chlorine as low as possible, and this is the reason that most of the examples given in this application have been with experiments conducted with concentrations of 1% chlorine at atmospheric pressure.

If, however, reasons exist to make the use of higher concentrations advantageous, the data of the present example show that this can be done without any significant effects on the process of redispersion taught by the instant invention.

EXAMPLE 10

Effects of Pre-Reduction on Regeneration of Iridium: Platinum Catalysts

To show that the pre-reduction step is critical in the redispersion of iridium, which is an unexpected discovery to one familiar with the previous art in this field, the following experiment was performed. The procedure of Example 4 was followed, except that the pre-reduction step was omitted.

X-ray data (obtained as in Example 3) showed that 0% of big platinum was present and 100% of the iridium was present as large crystals. Chemisorption data support this, as the amount of gas adsorbed corresponded to about half of the metal in the sample being of large particle size. It should be noted that this experiment redispersed the platinum with good efficiency, showing that the pre-reduction step is not critical with this metal, and in addition showing the relative ease and non-criticality of processes designed to redisperse only platinum.

EXAMPLE 11

Effects of Multiple Treatments on the Regeneration of Iridium: Platinum catalysts As a further illustration of the beneficial effects of pre-reduction, dramatically demonstrated in the previous example, the following experiment was performed. The procedure given in Example 4 was followed, except that the treatment with 1% $Cl_2$, 1% $O_2$, 98% $N_2$ was at 500°C. for a holding period of 3 hours. Chemisorption data were obtained after this step, and indicated an overall dispersion of both metals to be 64%. If all the platinum is redispersed, which commonly takes place with sample 3(B) whatever the nature of the chlorine treatment, this corresponds to 72% of the iridium still being left as large crystals. However, this assumption was not verified by X-ray studies after this 3 hour treatment, as it was desired to carry out a second treatment without exposing the catalyst to air.

The sample was then given a second chlorine treatment identical with the first, i.e., 3 hour holding period at 500°C. After this, the chemisorption data showed that, within limits of error, all of the platinum and iridium was in atomic dispersion, i.e., the effective particle size was 11.6a. X-ray spectra, obtained as in Example 3, showed no large platinum crystals and 12% large iridium crystals.

Comparison with Example 4, where one pre-reduction was followed by a single 6 hour chlorine treatment, will show the superiority of the method of this example. In this case, a six hour chlorine treatment was also given, but it was stopped after the first 3 hours, the sample reduced again, cooled to room temperature and a second 3 hour treatment given. In Example 4, after one 6 hour treatment, between 27 and 45% of the iridium was still in the form of large crystals, as determined by two experimental methods. In marked contrast, the present example, using two 3 hour treatments, (each preceded by a reduction step) resulted in very little large iridium being detected by either method.

What is claimed is:

1. A process for regenerating a supported hydrocarbon reforming catalyst containing at least about 0.1 wt. % iridium in the metallic form, wherein the support is a refractory inorganic oxide, the catalyst being at least partially deactivated by the presence of carbonaceous deposits thereon which comprises the steps of (1) contacting said catalyst with an oxygen-containing gas at a temperature of at least 300°C. for a time sufficient to burn at least a substantial portion of said carbonaceous deposits from said catalyst; (2) contacting catalyst treated in step (1) with a reducing gas selected from the group consisting of hydrogen, carbon monoxide, nitric oxide, and mixtures thereof at an elevated temperature for a time sufficient to convert at least a portion of said iridium to its metallic form; and (3) contacting the catalyst containing iridium at least a portion of which has been reduced to the metallic form with a gas containing a halogen and oxygen at a temperature of at least 300°C., the oxygen being present in an amount sufficient to enhance the dispersion of the iridium on the catalyst but less than 5% by volume, at an oxygen partial pressure not exceeding about 0.1 atmosphere.

2. The process of claim 1 wherein the reducing gas is hydrogen.

3. The process of claim 1 wherein the oxygen is present in an amount ranging from 0.1 to 5 volume %.

4. The process of claim 1 wherein the halogen containing gas contains chlorine.

5. The process of claim 4 wherein the support is alumina.

6. The process of claim 4 wherein the catalyst is comprised of iridium and a metal selected from the group consisting of Groups IB, VIB, VIIB and VIII of the Periodic Table of the Elements.

7. The process of claim 6 wherein the catalyst is comprised of iridium and platinum.

8. The process of claim 1 wherein the halogen is chlorine and the gas of step (3) is comprised of chlorine and 0.1 to 1.0 volume % of oxygen.

9. A process for regenerating a hydrocarbon reforming catalyst containing from 0.01 to 1.0 wt. % iridium in the metallic form and supported on a refractory inorganic oxide, said catalyst being at least partially deactivated by the presence of carbonaceous deposits thereon which comprises the steps of (1) contacting said catalyst with an oxygen-containing gas at a temperature of at least 300°C. for a time sufficient to burn at least a substantial portion of said carbonaceous deposits from said catalyst; (2) contacting the treated catalyst with hydrogen at a temperature of at least 100°C. for a time sufficient to convert a portion of said iridium to its metallic form; and (3) contacting the catalyst containing iridium at least a portion of which has been reduced to its metallic form with a gas containing a halogen and about 0.1 to 5 volume % oxygen, at an oxygen partial pressure not exceeding avbout 0.1 atmosphere at a temperature of at least 300°C. and for a time sufficient to enhance the dispersion of the iridium on the catalyst to a value greater than that of the partially deactivated catalyst.

10. The process of claim 9 wherein the halogen is chlorine.

11. The process of claim 9 wherein the oxygen in step (3) is present in an amount of about 0.1 to 0.3 volume %.

12. The process of claim 9 wherein step (3) is conducted at a temperature of about 450°–550°C.

13. A process for regenerating an alumina supported naphtha reforming catalyst containing platinum and at least about 0.1 wt. % iridium in the metallic form, said catalyst being at least partially deactivated by the presence of carbonaceous deposits thereon which comprises the steps of (1) contacting said catalyst with an oxygen-containing gas at a temperature of about 300° to 600°C. for a time sufficient to burn at least a substantial portion of said carbonaceous deposits from said catalyst; (2) contacting the treated catalyst with hydrogen at a temperature between about 200°– 550°C. for a time sufficient to convert at least a portion of said iridium and platinum to their metallic form; and (3)

contacting the catalyst containing platinum and iridium at least portions of which have been reduced to their metallic form with a gas comprising chlorine and from about 0.1 – 5.0 volume % oxygen, at an oxygen parital pressure not exceeding about 0.1 atmosphere at a temperature of at least about 300°C. for a time sufficient to increase the surface area of the iridium and platinum on said catalyst to at least about 200 m²/gm.

14. The process of claim 13 wherein the oxygen of step (3) is present in an amount of about 0.1 to 1.0% by volume.

15. The process of claim 14 wherein step (3) is conducted at a temperature of about 450°–550°c.

16. The process of claim 14 wherein the regeneration of the catalyst includes a purge step subsequent to the reduction step but prior to treating the catalyst with the gas comprising chlorine and oxygen.

* * * * *